(12) United States Patent
Nabat et al.

(10) Patent No.: US 10,493,624 B1
(45) Date of Patent: Dec. 3, 2019

(54) MOBILE ROBOT

(71) Applicant: X Development LLC, Mountain View, CA (US)

(72) Inventors: Vincent Yves Michel Nabat, San Francisco, CA (US); Philip Mullins, San Francisco, CA (US); Justine Rembisz, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 201 days.

(21) Appl. No.: 15/389,699

(22) Filed: Dec. 23, 2016

(51) Int. Cl.
*G05B 15/00* (2006.01)
*G05B 19/00* (2006.01)
*B25J 9/16* (2006.01)
*B25J 5/00* (2006.01)
*B25J 13/08* (2006.01)

(52) U.S. Cl.
CPC .............. *B25J 9/1633* (2013.01); *B25J 5/00* (2013.01); *B25J 9/1697* (2013.01); *B25J 13/085* (2013.01); *G05B 2219/39112* (2013.01)

(58) Field of Classification Search
CPC . B25J 9/1633; B25J 5/00; B25J 9/1697; B25J 13/085
See application file for complete search history.

(56) References Cited

U.S. PATENT DOCUMENTS

| 7,991,505 | B2 | 8/2011 | Lert et al. | |
|---|---|---|---|---|
| 2012/0173018 | A1 | 7/2012 | Allen et al. | |
| 2014/0076644 | A1* | 3/2014 | Derenne | A61G 7/012 180/19.2 |
| 2016/0089283 | A1* | 3/2016 | DeLuca | A61G 1/0243 180/413 |
| 2017/0070680 | A1* | 3/2017 | Kobayashi | H04N 5/23293 |

* cited by examiner

*Primary Examiner* — Harry Y Oh
(74) *Attorney, Agent, or Firm* — Fish & Richardson P.C.

(57) ABSTRACT

Methods, systems, and apparatus, including an apparatus that includes a motorized base configured to move the apparatus; an upper portion coupled to the motorized base; one or more load-sensing devices located between the motorized base and the upper portion, the one or more load-sensing devices being configured to (i) detect forces between the upper portion and the motorized base, and (ii) provide force information based on the detected forces between different portions of the upper portion and the motorized base; and one or more processors performs operations of: obtaining the force information provided by the one or more load-sensing devices; determining a difference between the forces indicated by the force information from the one or more load-sensing devices; determining, based the difference in the forces, a movement to be performed by the apparatus; and providing control information to cause the motorized base to perform the determined movement.

20 Claims, 6 Drawing Sheets

MOBILE ROBOT

BACKGROUND

This specification generally relates to a robot. A robot may move in an environment based on interactions with a user.

SUMMARY

According to one innovative aspect of the subject matter described in this specification, a chassis of a mobile robot may include an upper part and a mobile lower part that are connected through one or more load sensors. Each load sensor can detect a force applied at a corresponding connection point, and information related to the sensed forces may be used by the mobile robot to determine a movement to be performed by the mobile robot.

In general, one innovative aspect of the subject matter described in this specification can be embodied in an apparatus including a motorized base configured to move the apparatus; an upper portion coupled to the motorized base; one or more load-sensing devices located between the motorized base and the upper portion, the one or more load-sensing devices being configured to (i) detect forces between the upper portion and the motorized base, and (ii) provide force information based on the detected forces between different portions of the upper portion and the motorized base; and one or more processors and one or more computer-readable media storing instructions that, when executed by the one or more processors, cause the one or more processors to: obtain the force information provided by the one or more load-sensing devices; determine a difference between the forces indicated by the force information from the one or more load-sensing devices; determine, based the difference in the forces, a movement to be performed by the apparatus; and provide control information to cause the motorized base to perform the determined movement.

These and other implementations can each optionally include one or more of the following features. To determine the movement to be performed by the apparatus, a speed of the movement to be performed by the apparatus may be determined. The speed of the movement may be inversely correlated to a magnitude of the forces between the upper portion and the motorized base. The speed of the movement may be positively correlated to a magnitude of the difference in the forces.

To determine the speed of the movement to be performed by the apparatus, information representing a source of the forces detected between the upper portion and the motorized base may be obtained. The source of the forces detected between the upper portion and the motorized base may be identified. The speed of the movement may be determined based at least in part on the identified source.

To determine the identity of the source of the forces detected between the upper portion and the motorized base, the information representing the source of the forces detected between the upper portion and the motorized base may be provided to a remote computing server. An indication of an identity of the source may be received from the remote computing server. The source of the forces detected between the upper portion and the motorized base may be a user of the apparatus. To determine the speed of the movement, the speed of the movement may be determined based at least in part on a profile of the user that is stored in the apparatus.

To determine the speed of the movement to be performed by the apparatus, information representing a surrounding environment of the apparatus may be obtained. The speed of the movement may be determined based at least in part on the information representing the surrounding environment of the apparatus.

The apparatus may further include a camera configured to obtain information representing a source of the forces detected between the upper portion and the motorized base. The one or more processors may execute further instructions to determine that the one or more load-sensing devices have detected the forces between the upper portion and the motorized base. In response to determining that the one or more load-sensing devices have detected the forces between the upper portion and the motorized base, the one or more processors may provide second control information to the camera to obtain the information representing the source of the forces detected between the upper portion and the motorized base.

The apparatus may further include a memory device. The one or more processors may execute further instructions to store, to the memory device, information representing the determined movement. To determine the difference between the forces indicated by the force information from the load-sensing devices, a moment may be determined based on the difference between the forces indicated by the force information from the load-sensing devices.

The subject matter described in this specification can be implemented in particular embodiments so as to realize one or more of the following advantages. A user may grab and pull/push the robot. This intention will be detected by the robot and the robot can follow this intention, which provides a way to interact with the robot without any additional devices (e.g., a joystick). A simpler way of analyzing a load may be achieved, as the sensing of the load may be used by the robot to analyze what has been added to its load area. Force sensing may safely reduce the maximum speed of the robot, so the robot remains safe even with a heavy load. A protective stop may be implemented through software to enhance operation safety if an overload is detected (e.g., if someone is trying the ride the robot). Force-sensing data may be used with other sensor data to determine a robot's actions. Force-sensing data may be used in conjunction with other sensors to determine what and how many items the robot has in its payload area.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
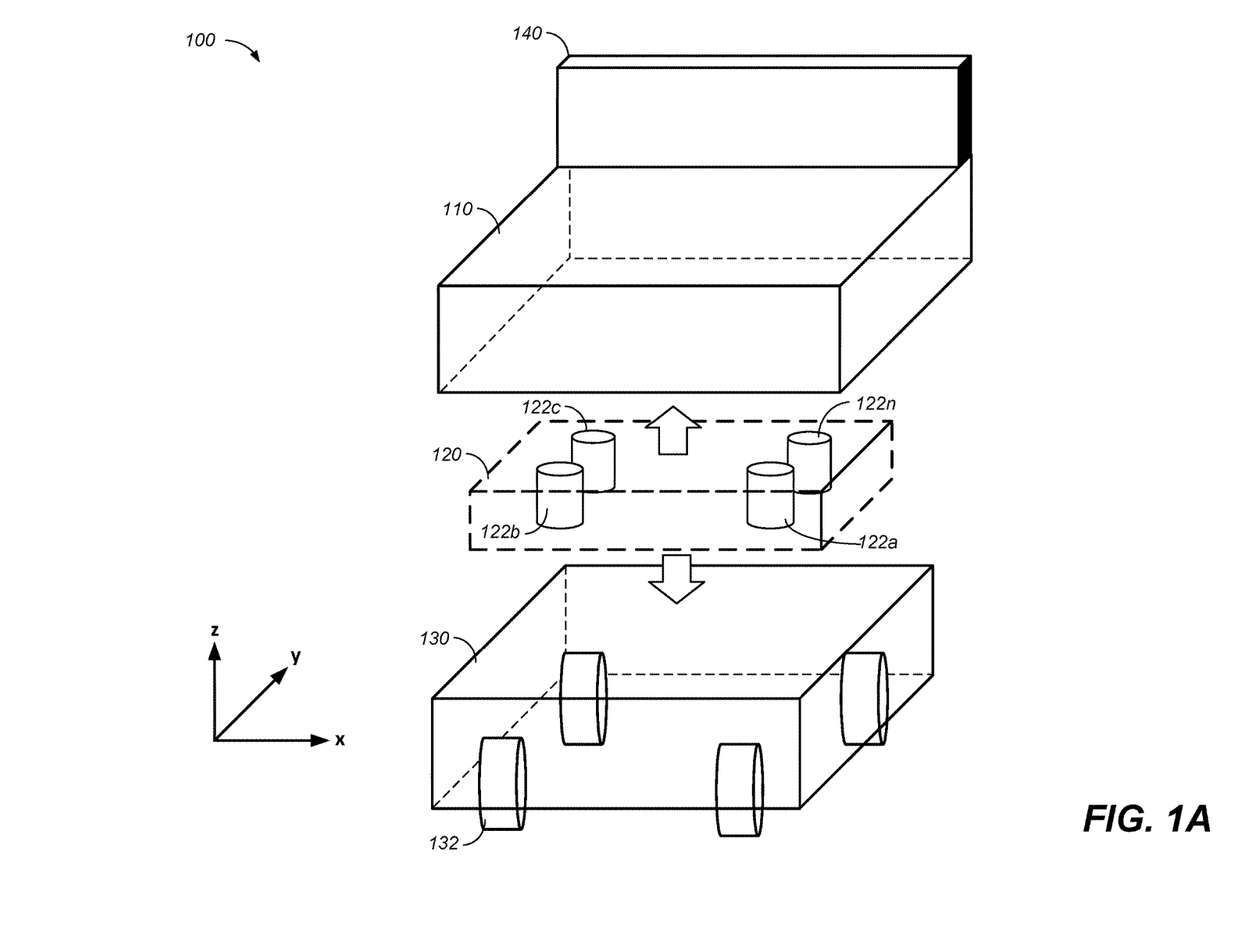
FIGS. 1A, 1B, 1C, and 1D illustrate an example mobile robot.

FIG. 1A illustrates an example mobile robot 100. In general, a mobile robot may move in an environment based on interactions with a user of the mobile robot. For example, the mobile robot may be a personal assistant in a home environment. As another example, the mobile robot may be a loading/unloading robotic vehicle in a warehouse environment. Conventionally, to control movements of a mobile robot, a user may use an additional control such as a joystick or a control software running on a computer that is separated from the mobile robot. The mobile robot 100 illustrates a human-robot interface that enables a movement control of a mobile robot without an additional control. For example, the user may provide instructions to the robot by applying a force to the exterior of the mobile robot 100. This mechanism provides an intuitive human-robot interface for the user and may enhance the user's experience with a mobile robot. The mobile robot 100 includes an upper portion 110, a load sensor group 120, and a mobile base 130.

The upper portion 110 may be a chassis that includes a frame. In some implementations, the upper portion 110 may include one or more data processing elements (e.g., a board, a module, control circuitry, or any other suitable data processing elements), and/or one or more sensory elements (e.g., a camera, an accelerometer, a gyroscope, a global positioning system (GPS), a microphone, or any other suitable sensors), and/or one or more output elements (e.g., a monitor, a speaker, or any other suitable output elements), and/or control circuitry for the mobile robot 100, and/or one or more power sources (e.g., a battery). In some other implementations, the upper portion 110 may be a chassis that includes the frame only.

In some implementations, a handle 140 may be attached to the upper portion 110 to allow a user to push or pull the mobile robot 100. In some implementations, the handle 140 may include one or more data processing elements, and/or one or more sensory elements, and/or one or more output elements, and/or control circuitry for the mobile robot 100, and/or one or more power sources. In some other implementations, the handle 140 may be a frame only.

The mobile base 130 may be a chassis that includes a frame and a transport portion 132. The transport portion 132 enables movements of the mobile robot 100. The transport portion 132 may include one or more wheels, one or more caterpillar tracks, robotic legs, or any other suitable hardware that enables movements of the mobile robot 100. In some implementations, the mobile base 130 may include one or more data processing elements, and/or sensory elements, and/or one or more output elements, and/or control circuitry for the mobile robot 100, and/or one or more power sources. Alternatively, the mobile base 130 may be a chassis that includes the frame and the transport portion only.

The load sensor group 120 mechanically couples the upper portion 110 and the mobile base 130. The load sensor group 120 includes one or more load sensors 122a to 122n, where n is an integer that is equal to or greater than one. FIG. 1A illustrates four load sensors, but fewer (e.g., one, two, three) or more (e.g., five, ten, etc.) load sensors may be included in the load sensor group 120. In some implementations, one or more load sensors of the load sensor group 120 may be configured to sense forces being exerted on the mobile robot 100 along a single-axis (e.g., a force vector along the z axis). In some implementations, one or more load sensors of the load sensor group 120 may be configured to sense forces being exerted on the mobile robot 100 along multiple-axes (e.g., a force vector along the x-y-z coordinate system). To control movements, the mobile robot 100 analyzes forces sensed by the load sensor group 120 to determine a movement of the mobile robot 100.

Figure 1B:
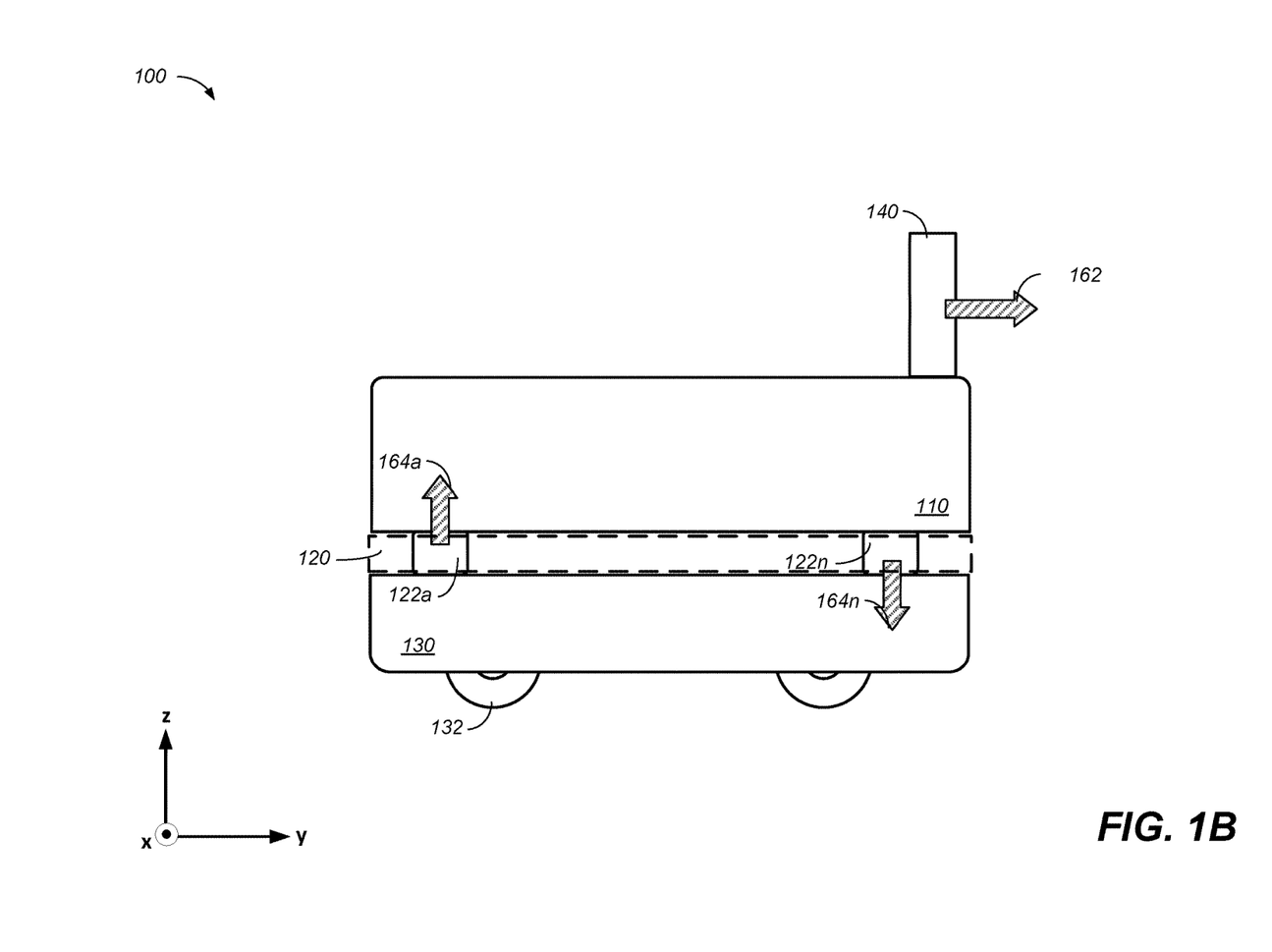

FIG. 1B illustrates an example where a user pulls the handle 140 as an attempt to guide the movement of the mobile robot 100. The horizontal force 162 applied by the user on the handle 140 along the +y direction induces forces among load sensors 122a-122n, which may be used to control a movement of the mobile robot 100. A force measurement may be made based on a force that is currently applied to a load sensor, or based on a difference between a force sensed by a load sensor after the application of an external force (e.g., the horizontal force 162) and a force sensed by the load sensor before the application of the external force, or based on a difference between a force sensed by a load sensor and a reference point (e.g., the center of the load sensor group 120 or another predetermined reference point). In some implementations, a load sensor may provide data that represents the force measurement that represents a change of the force sensed by a load sensor before and after the application of the external force. In some other implementations, a load sensor may provide data that represents a measured force (e.g., 100 N), and another data processing component of the mobile robot 100 may determine a change in the measured force based on the measured force and an earlier-measured force. In this example, the load sensor 122a detects a force measurement as indicated by an upward force 164a along the +z direction, while the load sensor 122n detects a force measurement as indicated by a downward force 164n along the −z direction.

Based on the force measurements provided by the load sensors 122a-122n, the mobile robot 100 may determine that a moment has been detected by the load sensor group 120. For example, using the relative positions of the load sensors 122a-122n with respect to a reference point (e.g., the center of the load sensor group 120 or another predetermined reference point) and using the magnitude and the direction detected by each load sensor, the mobile robot 100 may determine that a moment is applied about the reference point. Based on the determination that a moment has been sensed, the mobile robot 100 may determine that the user wishes to move the mobile robot 100 in a certain direction (e.g., +y direction). In this example, after the mobile robot 100 determines that the user wishes to move the mobile robot 100 in the +y direction, the mobile robot 100 may issue control signals to circuitry that controls the transport portion 132 to move the mobile robot 100 in the +y direction.

Figure 1C:
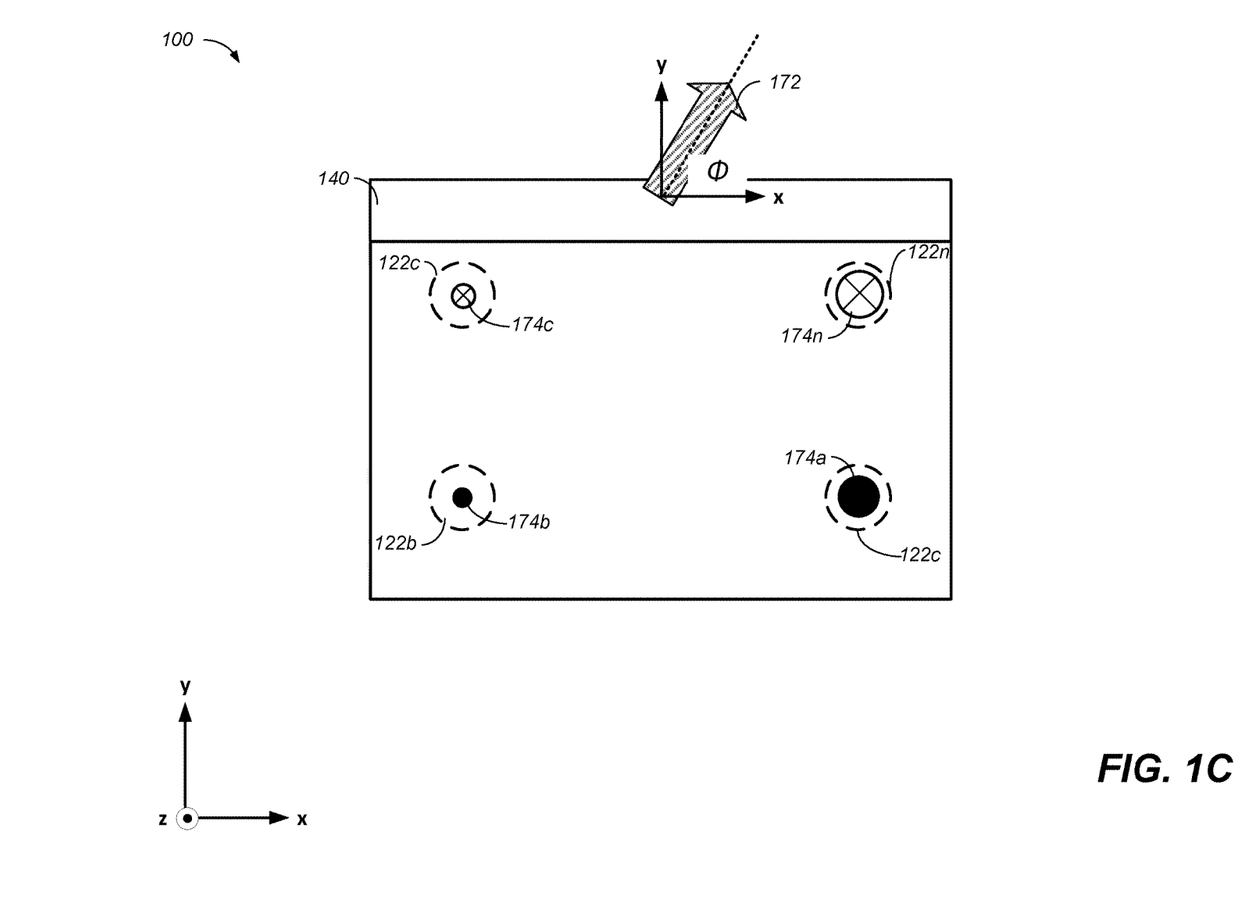

FIG. 1C illustrates another example where a user pulls the handle 140 as an attempt to guide the movement of the mobile robot 100. The force 172 applied by the user on the handle 140 along a direction along the x-y plane induces changes in forces sensed among load sensors 122a-122n, which may be used to control a direction of a movement of the mobile robot 100. In this example, the load sensor 122a detects a large force as indicated by an upward force 174a along the +z direction, the load sensor 122b detects a small force as indicated by an upward force 174b along the +z direction, the load sensor 122c detects a small force as indicated by a downward force 174c along the −z direction, and the load sensor 122n detects a large force as indicated by a downward force 174n along the −z direction. Based on the forces measured by the load sensors 122a-122n, the mobile robot 100 may calculate the difference in the measured forces, and determine that a moment has been detected by the load sensor group 120. Based on the determination that a moment has been sensed, the mobile robot 100 may determine that the user wishes to move the mobile robot 100 in a direction that is $\phi$-degrees from +x direction. After the mobile robot 100 determines that the user wishes to move the mobile robot 100 in the determined direction, the mobile robot 100 may issue control signals to circuitry that controls the transport portion 132 to move the mobile robot 100 in the direction that is $\phi$-degrees from the +x axis.

In some implementations, the mobile robot 100 may determine a speed of the movement based on the magnitude of the difference in forces measured by the load sensors 122a-122n, (e.g., the moment). The speed of the movement may be positively correlated to a magnitude of the difference in the forces. For example, if a user applies a greater strength on the handle 140 (e.g., pushes or pulls harder on the handle 140), a greater moment may be detected by the load sensor group 120, and the mobile robot 100 may issue control signals that would move the mobile robot 100 at a higher speed. In some implementations, a threshold speed that corresponds to a threshold difference in the forces may be programmed into the mobile robot 100, such that the speed of mobile robot 100 would not exceed the threshold speed even if the determined magnitude of the moment exceeds the threshold force magnitude.

In some implementations, the mobile robot 100 may include other sensors such as a camera. The information collected by other sensors may be used with the force information to determine a movement of the mobile robot 100. For example, after the mobile robot 100 has determined that a moment has been applied, the mobile robot 100 may control the camera to capture a picture or a video of a source (e.g., a user) of the moment. The mobile robot 100 may use a machine learning model to identify the source. Based on the identity of the source and the force information, the mobile robot 100 may determine a movement of the mobile robot 100. As an example, if the mobile robot 100 determines that the person pulling the mobile robot 100 is a child, the mobile robot 100 may lower the maximum speed of the mobile robot 100. As another example, given the same moment magnitude, the mobile robot 100 may move at two different speeds for two different users that are identifiable by the mobile robot 100. A mapping between moment magnitudes and corresponding movement speeds for different users may be specified in user profiles that are stored in the mobile robot 100. As another example, the camera may capture a surrounding of the mobile robot 100 and performs an object recognition of the surrounding. If the mobile robot 100 determines that an obstacle is ahead, the mobile robot 100 may decrease the speed of the movement.

Figure 1D:
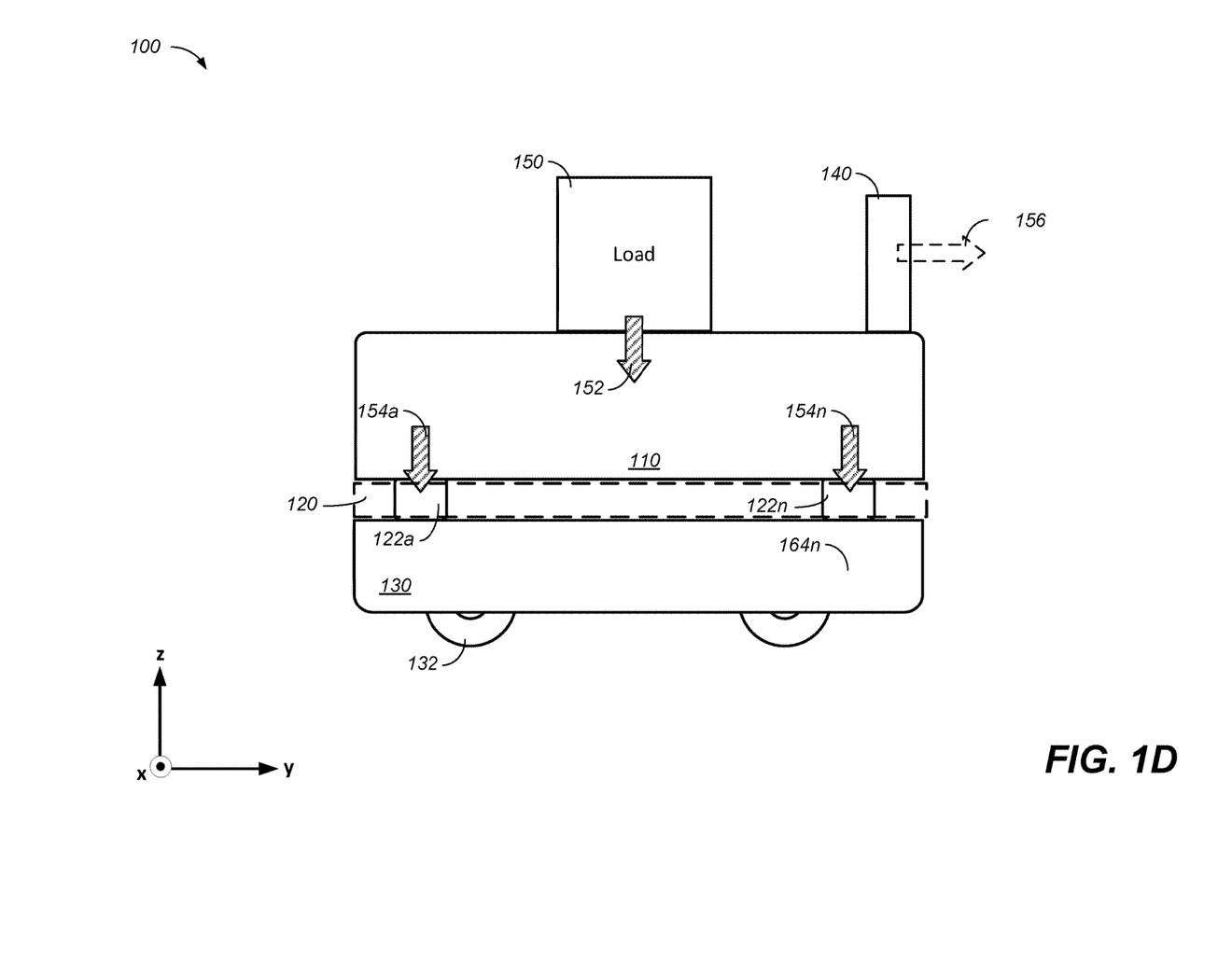

FIG. 1D illustrates another example where a load 150 is placed on a surface of the upper portion of the mobile robot 100. The placement of the load 150 induces a downward force 152 along the −z direction that is applied on the robot 110, and induces forces that are applied on load sensors 122a-122n. In this example, the load sensor 122a detects a change in the applied force as indicated by a downward force 154a along the −z direction, while the load sensor 122n detects a change in the applied force as indicated by a downward force 154n along the −z direction.

In some implementations, the forces detected by the load sensor group 120 may be used to determine whether there is a load placed on a surface of the upper portion of the mobile robot 100. For example, the mobile robot 100 may determine that there is a load 150 placed on a surface of the upper portion of the mobile robot 100 if the magnitude of a difference between the forces measured by load sensors in the load sensor group 120 exceeds a threshold value.

In some implementations, the magnitude of the difference between the forces detected by the load sensor group 120 may be used to control the speed of the mobile robot 100, or to stop the mobile robot 100 for safety considerations. The speed of the movement may be inversely correlated to a magnitude of the forces between the upper portion 110 and the motorized base 130. For example, when a horizontal force 156 is applied in the +y direction, the mobile robot 100 may move slower with a heavier load 150. As another example, if a net magnitude of the forces detected by the load sensor group 120 exceeds a threshold value (e.g., a weight of the load 150 exceeds a threshold weight), the mobile robot 100 may issue control signals to the transport portion 132 to stop a movement of the mobile robot 100 even if an application of the horizontal force 156 is being applied.

In some implementations, the forces detected by the load sensor group 120 may be used to determine whether the load 150 is unbalanced. For example, if a difference between the downward force 154a and the downward force 154n exceeds a threshold value, the mobile robot 100 may determine that the load 150 is unbalanced. In response to determining that the load 150 is unbalanced, the mobile robot 100 may issue a control signal to provide a warning (e.g., a visual or an audio warning) to a user, or to stop a movement of the mobile robot 100.

In some implementations, the mobile robot 100 may include other sensors such as a camera. The information collected by other sensors may be used with the force information to determine a movement of the mobile robot 100. For example, after the mobile robot 100 has determined that the load sensors 122a-122n have detected a change in downward forces along the −z direction, the mobile robot 100 may control the camera to capture a picture or a video of a source (e.g., the load 150) of the forces. The mobile robot 100 may use a machine learning model to identify the source. Based on the identity of the source and the force information, the mobile robot 100 may determine a movement of the mobile robot 100. As an example, if the mobile robot 100 determines that the load 150 is a case of eggs, the mobile robot 100 move slower as compared with the case where a load of books having the same weight is placed on the upper portion 110. As another example, if the mobile robot 100 determines that the load 150 is a child, the mobile robot 100 may issue control signals to the transport portion 132 to stop a movement of the mobile robot 100 even if an application of the horizontal force 156 is being applied.

Figure 2:
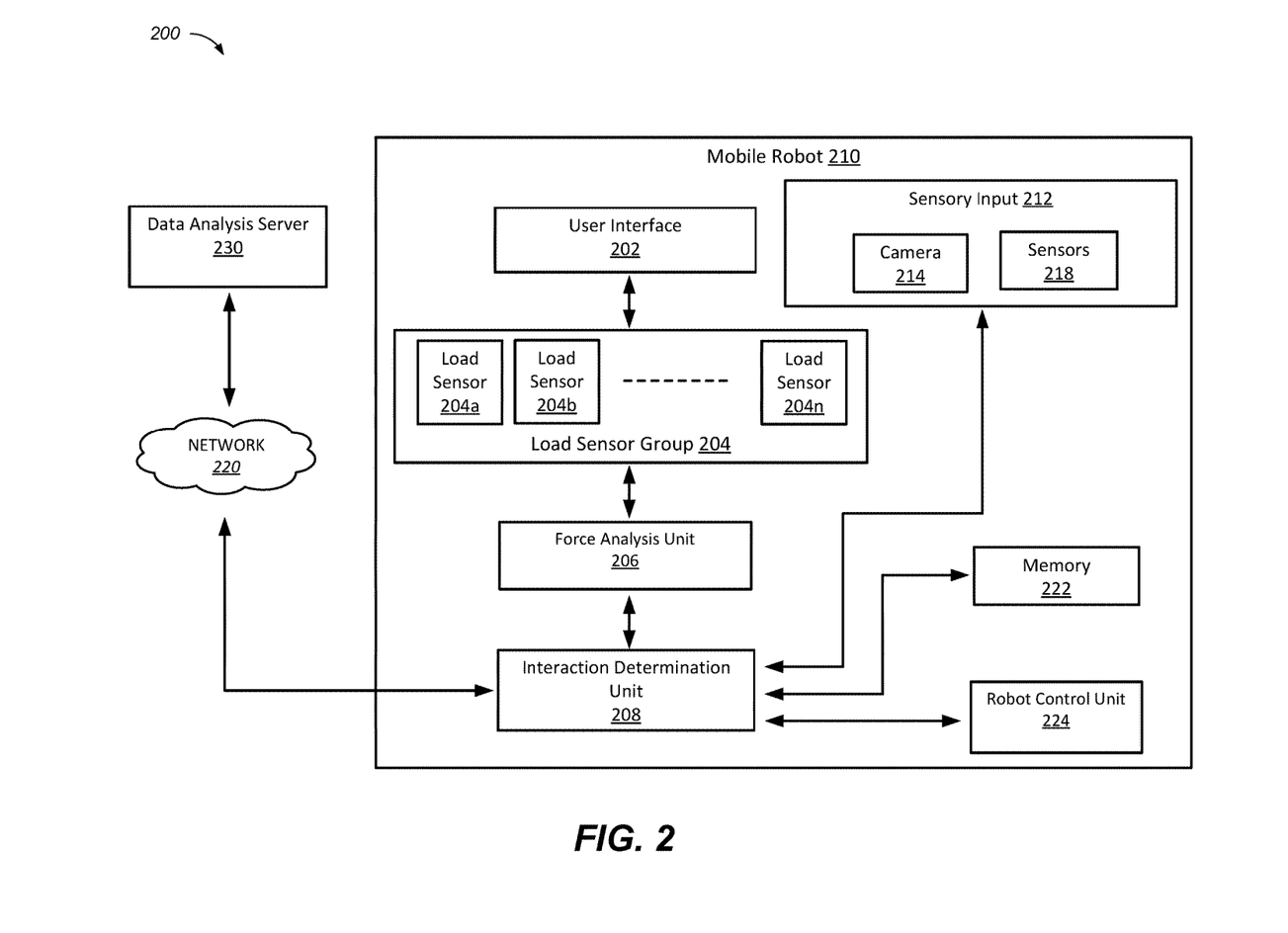
FIG. 2 is a block diagram of an example system for controlling a mobile robot.

FIG. 2 shows a block diagram of an example system 200 for controlling an example mobile robot 210. The system 200 includes a mobile robot 210, a network 220, and a data analysis server 230.

The mobile robot 210 includes a user interface 202, a load sensor group 204, a force analysis unit 206, an interaction determination unit 208, a sensory input 212, a memory 222, and a robot control unit 224. Although not shown in FIG. 2, the mobile robot 210 includes an upper portion (which may include a handle and/or other mechanical parts), a load sensor group, and a mobile base similar to the mobile robot 100 as described in reference to FIG. 1A.

In general, the user interface 202 is an interface where a user may control a movement of the mobile robot 210. For example, referring to FIG. 1A, the handle 140 may be a part of the user interface 202. As another example, referring to FIG. 1A, any surface of the frame of the upper portion 110 or the frame of the mobile base 130 may be a part of the user interface 202 because when a user applies a force on a surface, forces may be measured by the load sensor group 120.

In general, the load sensor group 204 is configured to detect a force applied between an upper portion and a mobile base of the mobile robot 210 and output force information that indicates a force sensed by the load sensors 204a-204n. In this example, the mobile base is a lower portion of the mobile robot 210. Similar to the load sensor group 120 as described in reference to FIGS. 1A-1D, the load sensor group 204 includes one or more load sensors 204a-204n, where n is an integer that is equal to or greater than one. A load sensor may be a multi-axes load cell that can measure a force in multiple dimensions, or a single-axis load cell that can measure a force in one dimension. In general, a resolution of the force analysis increases as the number of load sensors distributed across the load sensor group 204 increases.

The force analysis unit 206 is configured to obtain force information from the load sensor group 204, and analyzes the forces sensed by the load sensors 204a-204n. For example, the force analysis unit 206 may map each force sensed by a respective load sensor (e.g., 204a) to a two-dimensional or three-dimensional coordinate system that corresponds to a placement of the respective load sensor relative to a reference point (e.g., the center of the load sensor group 120). Based on the mapping, the force analysis unit 206 may then determine a magnitude and direction of a net force with respect to the reference point. In some implementations, the force analysis unit 206 may determine a moment of the net force about the reference point. For example, the force analysis unit 206 may determine a moment of the net force about the reference point to determine whether a moment is detected by the load sensor group 204. The force analysis unit 206 may also determine the magnitude and the direction of the moment. The force analysis unit 206 may be implemented in the upper portion or the mobile base of the mobile robot 210.

The interaction determination unit 208 is configured to obtain the analyzed force information from the force analysis unit 206 and determine a movement for the mobile robot 210. The interaction determination unit 208 may be implemented in the upper portion or the mobile base of the mobile robot 210. In some implementations, the interaction determination unit 208 may determine a direction of the movement. For example, based on the determination that a moment has been sensed, the interaction determination unit 208 may determine that the user wishes to move the mobile robot in the +y direction. In some implementations, the interaction determination unit 208 may determine a speed of the movement of the mobile robot 210. For example, based on the magnitude of the moment, the interaction determination unit 208 may determine a speed of the movement of the mobile robot 210.

In some implementations, the interaction determination unit 208 may use information collected by the sensory input 212 with the analyzed force information from the force analysis unit 206 to determine a movement of the mobile robot 210. The sensory input 212 includes a camera 214 and/or other sensors 218 (e.g., an accelerometer, a gyroscope, a global positioning system (GPS), a microphone, or any other suitable sensors). For example, after the interaction determination unit 208 has determined that a moment has been applied, the interaction determination unit 208 may control the camera to capture a picture or a video of a source (e.g., a user) of the moment. The interaction determination unit 208 may use a machine learning model to identify the source. Based on the identity of the source and the force information, the interaction determination unit 208 may determine a movement of the mobile robot 210. The sensory input 212 may be implemented in the upper portion or the mobile base of the mobile robot 210.

In some implementations, the interaction determination unit 208 may use the analyzed force information to determine whether the mobile robot 210 is on a tilt. In some implementations, the interaction determination unit 208 may use the analyzed force information to determine whether the mobile robot 210 is being picked up. In some implementations, the interaction determination unit 208 may use the analyzed force information as a redundancy or a double check for an inertial measurement unit (IMU) implemented in the mobile robot 210. In some implementations, the interaction determination unit 208 may use the analyzed force information to determine a shift of the center of gravity of the mobile robot 210.

In some implementations, the interaction determination unit 208 may collect analyzed force information from the force analysis unit 206 over a period of time. In some implementations, the interaction determination unit 208 may use the collected analyzed force information over time and determine a pattern based on the collected information. The interaction determination unit 208 may then use the determined pattern to determine a movement for the mobile robot 210. For example, the mobile robot 210 may allow a user to define and recognize gestures based on the force readings (e.g., a double tap to mean go to a certain place, a jolt to immediately stop, etc.). The user-specific tapping patterns may be stored in a user profile in the memory 222.

In some implementations, the interaction determination unit 208 may use the collected analyzed force information over time to determine a status of a task being performed by the mobile robot 210. For example, a user may use the mobile robot 210 to carry and deliver five items around an office environment. As each item is being delivered, the mobile robot 210 may update the status of the task (e.g., three out of five items delivered) based on the analyzed force information.

The robot control unit 224 is configured to receive, from the interaction determination unit 208, information representing the determined movement of the mobile robot 210, and to issue one or more control signals to circuitry controlling a movement of the mobile robot 210. For example, the robot control unit 224 may issue control signal to control a speed of a transport portion of the mobile robot 210. The robot control unit 224 may be implemented in the upper portion or the mobile base of the mobile robot 210.

The memory 222 is configured to store information related to movements of the mobile robot 210. In some implementations, the memory 222 may store user profiles of the users for controlling a speed of the mobile robot 210 depending on the identity of the user. In some implementations, the memory 222 may store history information of a mobile robot movement. For example, a user may guide the mobile robot 210 around a house, and the mobile robot 210 may store information such as the guided route and the movement speeds along the route, such that the mobile robot 210 may perform the movement automatically according to the history information stored in the memory 222. The memory 222 may be implemented in the upper portion or the mobile base of the mobile robot 210.

In some implementations, the mobile robot 210 may communicate with the data analysis server 230 across the network 220 to process data obtained by the mobile robot 210. The data analysis server 230 may be a server in a cloud-based environment. For example, the data analysis server 230 may run a machine learning model for image recognition. The interaction determination unit 208 may send an image captured by the camera 214 to the data analysis server 230 to identify a source of the applied force. For example, the data analysis server 230 may identify whether a load on the upper portion of the mobile robot 210 is a basket of eggs or a basket of apples.

The network 220 may be wired or wireless or a combination of both. The network 220 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of networks.

Figure 3:
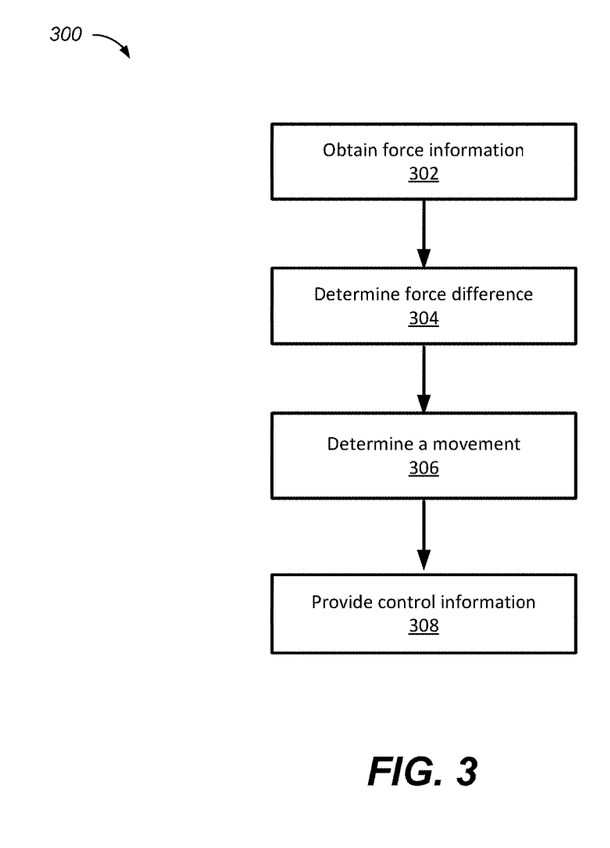
FIG. 3 is a flow diagram that illustrates an example of a process for controlling a mobile robot.

FIG. 3 is a flowchart of an example process 300 for controlling a mobile robot. The process 300 may be performed by a system such as the mobile robot 100 or the mobile robot 210.

The system obtains force information provided by one or more load-sensing devices, where the one or more load-sensing devices are located between a motorized base and an upper portion of a robot, the one or more load-sensing devices being configured to (i) detect forces between the upper portion and the motorized base, and (ii) provide the force information based on the detected forces between different portions of the upper portion and the motorized base (302). For example, referring to FIG. 2, the load sensor group 204 may detect a force applied between an upper portion and a mobile base of the mobile robot 210, and output force information that indicates the forces sensed by the load sensors 204a-204n.

In some implementations, the system may determine that the one or more load-sensing devices have detected the forces between the upper portion and the motorized base. In response to determining that the one or more load-sensing devices have detected the forces between the upper portion and the motorized base, the system may provide control information to a camera to obtain the information representing the source of the forces detected between the upper portion and the motorized base. For example, referring to FIG. 2, after the interaction determination unit 208 has determined that a moment has been applied, the interaction determination unit 208 may control the camera to capture a picture or a video of a source (e.g., a user) of the moment.

The system determines a difference between the forces indicated by the force information from the load-sensing devices (304). For example, referring to FIG. 2, the force analysis unit 206 may map each force sensed by a respective load sensor (e.g., 204a) to a two-dimensional or three-dimensional coordinate system that corresponds to a placement of the respective load sensor relative to a reference point (e.g., the center of the load sensor group 120). Based on the mapping, the force analysis unit 206 may then determine a magnitude and direction of a net force with respect to the reference point.

In some implementations, to determine the difference between the forces indicated by the force information from the load-sensing devices, the system may determine a moment based on the difference between the forces indicated by the force information from the load-sensing devices. For example, referring to FIG. 2, the force analysis unit 206 may determine a moment of the net force about the reference point to determine whether a moment is detected by the load sensor group 204.

The system determines, based the difference in the forces, a movement to be performed by the robot (306). For example, referring to FIG. 2, the interaction determination unit 208 may obtain the analyzed force information from the force analysis unit 206 and determine a movement for the mobile robot 210.

In some implementations, the system may determine a speed of the movement to be performed by the robot. For example, referring to FIG. 2, the interaction determination unit 208 may determine a speed of the movement to be performed by the mobile robot 210. The speed of the movement may be inversely correlated to a magnitude of the forces between the upper portion and the motorized base. For example, referring to FIG. 1D, when a horizontal force 156 is applied in the +y direction, the mobile robot 100 may move slower with a heavier load 150. The speed of the movement may be positively correlated to a magnitude of the difference in the forces. For example, referring to FIG. 1B, if a user applies a greater strength on the handle 140 (e.g., pushes or pulls harder on the handle 140), a greater moment may be detected by the load sensor group 120, and the mobile robot 100 may issue control signals that would move the mobile robot 100 at a higher speed.

To determine the speed of the movement, the system may obtain information representing a source of the forces detected between the upper portion and the motorized base. For example, referring to FIG. 1B, after the mobile robot 100 has determined that a moment has been applied, the mobile robot 100 may control the camera to capture a picture or a video of a source (e.g., a user) of the moment. The system may then identify the source of the forces detected between the upper portion and the motorized base. For example, the mobile robot 100 may use a machine learning model to identify the source.

In some implementations, to determine the identity of the source of the forces detected between the upper portion and the motorized base, the system may provide, to a remote computing server, the information representing the source of the forces detected between the upper portion and the motorized base. The system may receive, from the remote computing server, an indication of an identity of the source. For example, referring to FIG. 2, the interaction determination unit 208 may send an image captured by the camera 214 to the data analysis server 230 to identify a source of the applied force.

The system may then determine the speed of the movement based at least in part on the identified source. As an example, referring to FIG. 1D, if the mobile robot 100 determines that the load 150 is a case of eggs, the mobile robot 100 may move slower as compared with the case where a load of books having the same weight is placed on the upper portion 110.

In some implementations, the source of the forces detected between the upper portion and the motorized base may a user of the robot. To determine the speed of the movement, the system may determine the speed of the movement based at least in part on a profile of the user that is stored in the robot. As an example, referring to FIG. 1B, given the same moment magnitude, the mobile robot 100 may move at two different speeds for two different users that are identifiable by the mobile robot 100. A mapping between moment magnitudes and corresponding movement speeds for different users may be specified in user profiles that are stored in the mobile robot 100.

In some implementations, to determine the speed of the movement to be performed by the robot, the system may obtain information representing a surrounding environment of the robot. The system may determine the speed of the movement based at least in part on the information representing the surrounding environment. For example, referring to FIG. 2B, a camera may capture a surrounding of the mobile robot 100 and performs an object recognition of the surrounding. If the mobile robot 100 determines that an obstacle is ahead, the mobile robot 100 may decrease the speed of the movement.

In some implementations, the system may determine a direction of the movement to be performed by the robot. For example, referring to FIG. 1B, the mobile robot 100 may determine a direction of the movement based on the direction of the moment.

The system provides control information to cause the motorized base to perform the determined movement (308). For example, referring to FIG. 2, the robot control unit 224 may receive, from the interaction determination unit 208, information representing the determined movement of the mobile robot 210, and may issue one or more control signals to circuitry controlling a movement of the mobile robot 210.

In some implementations, the system may store, to a memory device, information representing the determined movement. For example, referring to FIG. 2, a user may guide the mobile robot 210 around a house, and the mobile robot 210 may store information such as the guided route and the movement speeds along the route, such that the mobile robot 210 may perform the movement automatically according to the history information stored in the memory 222.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising:
a motorized base configured to move the apparatus;
an upper portion coupled to the motorized base;
multiple load-sensing devices located between the motorized base and the upper portion, wherein each of the multiple load-sensing devices is configured to (i) detect forces between a different portion of the upper portion and the motorized base, each of the multiple load-sensing devices being configured to detect forces in a direction that is substantially perpendicular to a horizontal plane of the apparatus, and (ii) provide force information based on the detected forces between the upper portion and the motorized base; and
one or more processors and one or more computer-readable media storing instructions that, when executed by the one or more processors, cause the one or more processors to:
obtain the force information provided by the multiple load-sensing devices;
determine a difference between the detected forces that are substantially perpendicular to the horizontal plane of the apparatus and are indicated by the force information from the multiple load-sensing devices;
determine, based the difference in the forces that are substantially perpendicular to the horizontal plane of the apparatus, a movement to be performed by the apparatus; and
provide control information to cause the motorized base to perform the determined movement.

2. The apparatus of claim 1, wherein determining the movement to be performed by the apparatus further comprises determining a speed of the movement to be performed by the apparatus.

3. The apparatus of claim 2, wherein the speed of the movement is inversely correlated to a magnitude of the forces between the upper portion and the motorized base.

4. The apparatus of claim 2, wherein the speed of the movement is positively correlated to a magnitude of the difference in the forces.

5. The apparatus of claim 2, wherein determining the speed of the movement to be performed by the apparatus further comprises:
obtaining information representing a source of the forces detected between the upper portion and the motorized base;
identifying the source of the forces detected between the upper portion and the motorized base; and
determining the speed of the movement based at least in part on the identified source.

6. The apparatus of claim 5, wherein determining the identity of the source of the forces detected between the upper portion and the motorized base further comprises:
providing, to a remote computing server, the information representing the source of the forces detected between the upper portion and the motorized base; and
receiving, from the remote computing server, an indication of an identity of the source.

7. The apparatus of claim 5,
wherein the source of the forces detected between the upper portion and the motorized base is a user of the apparatus, and
wherein determining the speed of the movement further comprises determining the speed of the movement based at least in part on a profile of the user that is stored in the apparatus.

8. The apparatus of claim 2, wherein determining the speed of the movement to be performed by the apparatus further comprises:
obtaining information representing a surrounding environment of the apparatus; and
determining the speed of the movement based at least in part on the information representing the surrounding environment of the apparatus.

9. The apparatus of claim 1, wherein determining the movement to be performed by the apparatus further comprises determining a direction of the movement to be performed by the apparatus.

10. The apparatus of claim 1, wherein determining the difference between the forces indicated by the force information from the load-sensing devices further comprises determining a moment based on the difference between the forces indicated by the force information from the load-sensing devices.

11. A computer-implemented method, comprising:
obtaining force information provided by multiple load-sensing devices, wherein the multiple load-sensing devices are located between a motorized base and an upper portion of a robot, each of the multiple load-sensing devices being configured to (i) detect forces between a different portion of the upper portion and the motorized base, each of the multiple load-sensing devices being configured to detect forces in a direction that is substantially perpendicular to a horizontal plane of the robot, and (ii) provide the force information based on the detected forces between the upper portion and the motorized base;
determining a difference between the detected forces that are substantially perpendicular to the horizontal plane of the apparatus and are indicated by the force information from the load-sensing devices;

determining, based the difference in the forces that are substantially perpendicular to the horizontal plane of the apparatus, a movement to be performed by the robot; and providing control information to cause the motorized base to perform the determined movement.

12. The computer-implemented method of claim 11, wherein determining the movement to be performed by the robot further comprises determining a speed of the movement to be performed by the robot.

13. The computer-implemented method of claim 11, further comprising:

determining that the multiple load-sensing devices have detected the forces between the upper portion and the motorized base; and in response to determining that the multiple load-sensing devices have detected the forces between the upper portion and the motorized base, providing second control information to a camera of the robot to obtain the information representing a source of the forces detected between the upper portion and the motorized base.

14. A non-transitory computer-readable medium storing instructions that, when executed by one or more processors, cause the one or more processors to perform operations of:

obtaining force information provided by multiple load-sensing devices, wherein the multiple load-sensing devices are located between a motorized base and an upper portion of a robot, each of the multiple load-sensing devices being configured to (i) detect forces between a different portion of the upper portion and the motorized base, each of the multiple load-sensing devices being configured to detect forces in a direction that is substantially perpendicular to a horizontal plane of the robot, and (ii) provide the force information based on the detected forces between the upper portion and the motorized base;

determining a difference between the detected forces that are substantially perpendicular to the horizontal plane of the apparatus and are indicated by the force information from the load-sensing devices;

determining, based the difference in the forces that are substantially perpendicular to the horizontal plane of the apparatus, a movement to be performed by the robot; and providing control information to cause the motorized base to perform the determined movement.

15. The computer-readable medium of claim 14, wherein determining the movement to be performed by the robot further comprises determining a speed of the movement to be performed by the robot.

16. The computer-readable medium of claim 14, wherein the operations further comprise:

determining that the multiple load-sensing devices have detected the forces between the upper portion and the motorized base; and in response to determining that the multiple load-sensing devices have detected the forces between the upper portion and the motorized base, providing second control information to a camera of the robot to obtain the information representing a source of the forces detected between the upper portion and the motorized base.

17. The apparatus of claim 1, comprising a camera configured to obtain image data indicating a source of the forces detected between the upper portion and the motorized base;

wherein the instructions, when executed, cause the one or more processors to determine the movement to be performed by the apparatus based on the image data.

18. The apparatus of claim 1, comprising a camera configured to obtain image data indicating a source of the forces detected between the upper portion and the motorized base;

wherein the instructions, when executed, cause the one or more processors to determine whether the detected forces that are substantially perpendicular to the horizontal plane of the apparatus are caused by an object placed on the upper portion or a person providing input to the apparatus.

19. The apparatus of claim 1, wherein the apparatus is configured to use the multiple load-sensing devices to detect human instructions to the apparatus and to measure loads carried on the upper portion of the apparatus.

20. The apparatus of claim 1, wherein apparatus comprises a handle, and the load-sensing devices are arranged so that the apparatus can detect forces applied on the handle in a horizontal plane through differences among forces detected by the load-sensing devices in a direction perpendicular to the horizontal plane.

* * * * *